United States Patent [19]

Kupperman et al.

[11] 4,108,104

[45] Aug. 22, 1978

[54] ONE PIECE PLASTIC MOLDED STRUCTURAL UNIT AND DOOR KNOCKER CONSTRUCTED THEREFROM

[75] Inventors: Sam Kupperman, Chicago; Dennis Kupperman, Glenview, both of Ill.

[73] Assignee: RB Toy Development Co., Skokie, Ill.

[21] Appl. No.: 811,168

[22] Filed: Jun. 29, 1977

[51] Int. Cl.[2] .......................... G01K 1/26; B28B 21/00

[52] U.S. Cl. ............................ 116/148; 116/DIG. 12; 425/806

[58] Field of Search ................. 116/148, 167, 172, 73, 116/DIG. 12; D8/401; 425/806

[56] References Cited

U.S. PATENT DOCUMENTS

| | | | |
|---|---|---|---|
| D. 211,566 | 7/1968 | Gragg | D8/401 |
| 602,573 | 4/1898 | Coggeshall | 116/172 |
| 1,266,875 | 5/1918 | Smith | 116/148 |
| 3,068,835 | 12/1962 | Stewart | 116/148 |
| 3,172,588 | 3/1965 | Bertold et al. | 425/806 R X |
| 3,230,921 | 1/1966 | Spiegel | 116/73 X |

FOREIGN PATENT DOCUMENTS

| | | | |
|---|---|---|---|
| 503,991 | 4/1939 | United Kingdom | 116/DIG. 12 |

*Primary Examiner*—Daniel M. Yasich
*Attorney, Agent, or Firm*—Vogel, Dithmar, Stotland, Stratman & Levy

[57] ABSTRACT

A one piece molded synthetic organic resin structure including a base and an arm connected thereto at spaced apart points by thin struts easily severed to separate the arm from the base. Connection means are provided on the arm and the base so that one end of the arm can be fixedly connected to the base leaving a free end of the arm overlying a portion of the base, the free end normally being urged against and in contact with the base. The arm is sufficiently flexible to permit the free end to be bent away from the base without breaking the arm, the release of the arm resulting in a snap movement thereof against the base causing a loud noise.

14 Claims, 6 Drawing Figures

ONE PIECE PLASTIC MOLDED STRUCTURAL UNIT AND DOOR KNOCKER CONSTRUCTED THEREFROM

BACKGROUND OF THE INVENTION

Door knockers of the type in which an arm is pivotally mounted on a base are notoriously old. Knockers of this type are usually made of metal in order to have the requisite weight to produce an audible tapping noise. Door knockers made from plastic have not heretofore been particularly feasible, since the light weight of the material makes them inappropriate for producing loud enough noises to be useful as a door knocker. Where plastics have been used for door knockers, they usually have been combined with metal tappers in order to produce the requisite noise.

The desirability of producing an all plastic door knocker inexpensively in a one piece construction which can be assembled by the users to provide a useful instrument has long been recognized but not yet achieved. The present invention is directed to fill this need.

SUMMARY OF THE INVENTION

This invention is directed and relates to a one piece construction of a base and arm which when assembled forms a door knocker.

An important object of the present invention is to provide a one piece construction which has the requisite parts for a plastic door knocker, the one piece construction being molded as one shot as a single unit.

Another object of the present invention is to provide a one piece structure comprising a synthetic organic resin base having at least a portion of the rear surface thereof flat, a synthetic organic resin arm connected to the base at spaced apart points by at least two relatively thin struts, each being easily severed to separate the arm from the base, boss receiving means on one of the arm and the front surface of the base and integral therewith, a boss on the other of the arm and the front surface of the base and integral therewith extending therefrom sized to fit within the boss receiving means and to be frictionally engaged thereby, the arm having a size such that when the boss and the boss receiving means are frictionally engaged the arm has a free end thereof overlying a portion of the base which is normally urged toward the base, the arm being flexible to permit the free end thereof when the boss is frictionally engaged by the boss receiving means to be bent away from the base without breaking the arm, the boss and boss receiving means cooperating with the arm thus mounted on the base to cause the arm to snap back toward and against the base upon release of the arm from the bent away position thereof.

Yet another object of the present invention is to provide a door knocker comprising a synthetic organic resin base having at least a portion of the rear surface thereof flat, an arm and means connecting the arm to the front surface of the base to provide a free end of the arm overlying a portion of the base which is normally urged toward the base, the arm being flexible to permit the free end thereof to be bent away from the base without breaking the arm, the base and connecting means cooperating with the arm to cause the arm to snap back toward and against the base upon release of the arm from the bent away position thereof.

These and other objects of the present invention may be more readily understood by reference to the following specification taken in conjunction with the drawings, in which:

DETAILED DESCRIPTION OF THE PREFERRED EMBODIMENT

Figure 3:
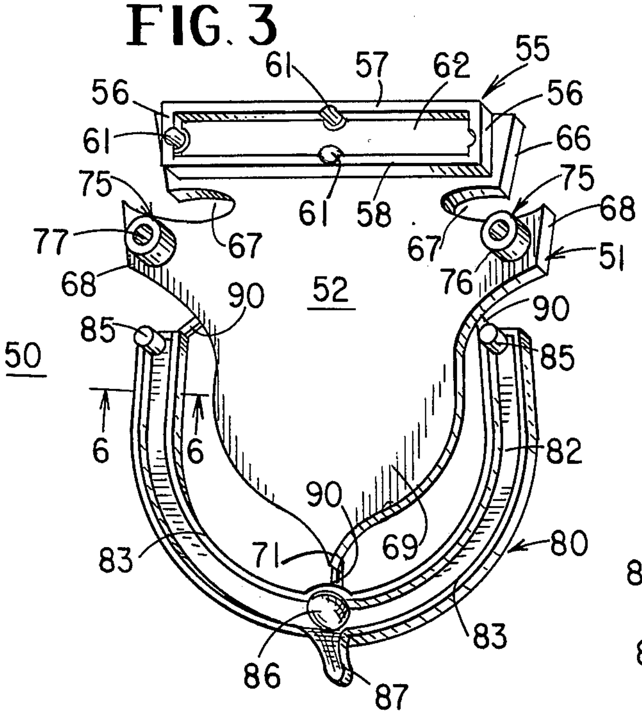
FIG. 3 is a front elevational view of the one piece construction which can be assembled to form the door knocker illustrated in FIG. 1.

Referring now to the drawings, and particularly to FIG. 3 thereof, there is disclosed a one piece structure or construction 50 including a base member 51 having a front surface 52 and a flat rear surface 53. A frame 55, rectangular in shape, is positioned near the top of the base 51 on the front surface 52 thereof. The frame 55 includes spaced apart end walls 56 interconnected by top wall 57 and a bottom wall 58. Four undercut buttons 61 are provided, one on each of the end walls 56 and one centrally located on each of the top wall 57 and the bottom wall 58. The frame 55 defines a name plate area 62.

The base 51 is shield-shaped and includes a rectangular top portion 66 defined by indents 67 on each side of the base 51. The base 51 also includes wing portions 68 each of which extends beyond the respective or adjacent ends of the rectangular top portion 66. Depending downwardly from the wings 68 is a central portion 69 defined by sinuous edges terminating in an apex 71. Positioned on each of the wings 68 of the base 51 and extending outwardly from the front surface 52 thereof are two boss receiving members 75 each comprised of a cylindrical member 76 having a circular aperture 77 therein.

An arm 80 generally U-shaped includes a front surface 81 and a rear surface 82, the rear surface 82 being provided with spaced apart strength providing rails 83 extending the entire longitudinal length of the arm 80. Each end of the arm 80 has a boss 85 in the form of a cylindrical member extending outwardly from the rear surface 82 of the arm. Each of the bosses 85 is sized to fit snugly within one of the circular apertures 77 of the boss receiving members 75. Positioned on the rear surface 82 of the arm 80 and located centrally on the bight portion of the U-shaped member is a protuberance 86; a tab 87 is also centrally located on the arm 80 in alignment with the protuberance 86 and extends away from the arm in a direction opposite to the protuberance, the protuberance extending in the same direction as the bosses 85.

Finally, the one piece construction 50 is completed by a plurality of thin connecting struts 90 interconnecting the arm 80 with the base 51. More particularly, one strut 90 is provided at each distal end of the arm 80 interconnecting the arm with the base 51 along the sinuous edge between the wings 68 on the apex 71. A third connecting strut 90 interconnects the apex 71 with the central portion of the arm 80. Each of the struts 90 is constructed and arranged easily to be severed with a normal scissors or wire cutter of the type usually found around the house.

Figure 4:
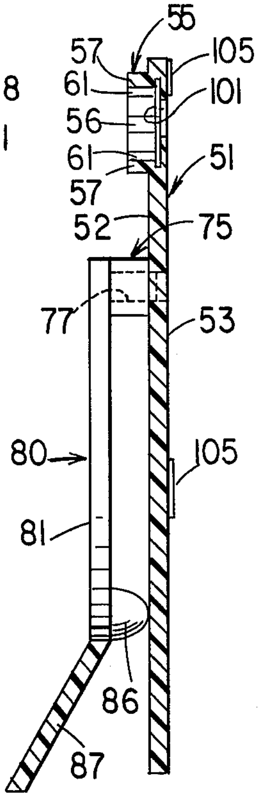
FIG. 4 is a sectional view of the door knocker illustrated in FIG. 1 as seen along line 4—4 thereof.
Figure 5:
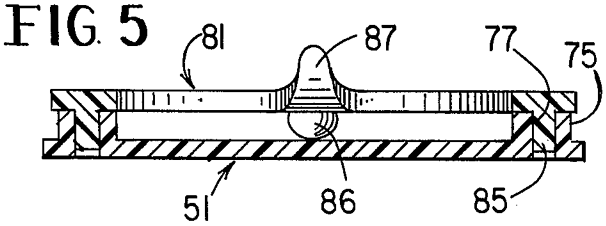
FIG. 5 is a view in section of the door knocker illustrated in FIG. 1, as seen along line 5—5 thereof.
Figure 6:
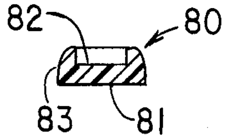
FIG. 6 is a view in section of the one-piece construction illustrated in FIG. 3, as seen along line 6—6 thereof.

The assembled construction or door knocker 100 is illustrated in FIGS. 1,2 and 4 and 5. To assemble the door knocker illustrated in FIG. 1, from that shown in FIG. 3, the connecting struts 90 are severed and removed and the bosses 85 are aligned with the openings 77 in each of the boss receiving members 75 and forced thereinto, the size being such to provide a tight frictional fit between the bosses 85 and the boss receiving members 75. A name plate 101, see FIG. 4, is inserted into the frame 55 and retained therein by each of the undercut buttons 61. Finally, adhesive means 105 positioned on the rear surface 53 of the base 51, permits permanent securing of the door knocker 100 onto a desired substrate (not shown).

Figure 2:
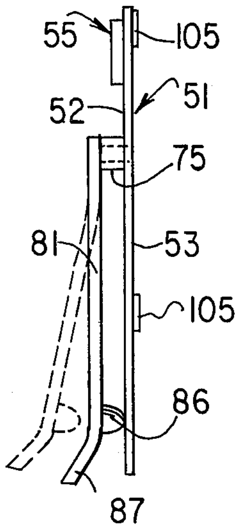
FIG. 2 is a side elevational view of the door knocker illustrated in FIG. 1.

Because the arm 80 is fixedly connected to the base 51 at spaced apart points 75, and because the one piece structure 50 is a synthetic organic resin which is rigid but resilient enough to permit the deformation of the arm without breaking, the door knocker 100 although light in weight operates in a manner to produce a sufficiently loud noise effectively to act as a door knocker. The arm 80 once mounted to the base 51 by cooperation of the bosses 85 and the boss receiving members 75 may be resiliently moved from the normal position shown in full line in FIGS. 2 and 3 to the bent away or dotted line position in FIG. 2, without breaking the arm 80. Due to the construction and the cooperation of the bosses 85 and the boss receiving members 75, the arm 80 is normally urged toward the base 51, as in the full line position of FIG. 2. After the arm is moved to the dotted line position as shown in FIG. 2, and released the natural resilience or spring characteristics of the synthetic organic resin causes the arm 80 to move rapidly and forcefully, that is to snap toward the base 51 and thereby to cause contact between the protuberance 86 and the front surface 52 of the base 51 resulting in a large volume noise. If the arm 80 were pivotally mounted on the base 51, the construction would not work as a door knocker, but the fixed mounting of the arm 80 to the base 51 provides the snap movement of the arm toward the base resulting in a sufficient sound for the device to act as a door knocker without metallic parts.

Synthetic organic resins acceptable for use in the present device 100 must be rigid to result in the snap action of the arm 80 yet not be so brittle to cause the arm to break during movement from the full line position to the dotted line position of FIG. 2. Synthetic organic resins useful herein are polystyrenes and rigid polyolefins, such as high density polyethylene and polypropylene.

Figure 1:
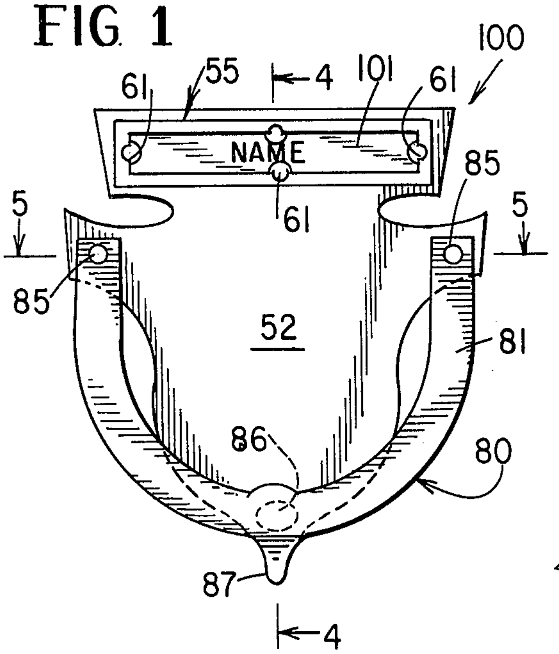
FIG. 1 is a front elevational view of a constructed door knocker.

The one piece structure 50 of the present invention is particularly useful in the premium field, wherein the structure 50 as molded is inserted into a cereal box as a give away item, later to be constructed to the door knocker illustrated in FIG. 1 by the purchaser of the cereal. The use of rigid synthetic organic resins of the type described in combination with the unique one piece design illustrated in FIG. 3 enable the structure to be made inexpensively enough to function as a premium item. On the other hand, the unique construction shown in FIG. 1 for the first time, permits synthetic organic resins to be used as an inexpensive door knocker which provides the requisite sound, but requires no metallic pieces. In a constructional example, the vertical dimension of the one piece construction illustrated in FIG. 3 is 3 11/16 inches, whereas the horizontal dimension between the wings 68 is 2 3/4 inches. The thickness of the arm 80 is 3/32 of an inch, including the ribs 83 whereas the base 51 thickness is 1/16 of an inch. The boss receiving members 75, extend 3/16 of an inch outwardly from the front surface 52 of the base 51 and the bosses 85 extend 2/16 of an inch outwardly from the rear surface 82 of the arm 80. The frame 55 extends 1/16 of an inch outwardly from the front surface 52 of the base 51 and is 2 1/16 of an inch long by 13/32 of an inch high. As may be seen therefore, the entire construction 50 is small in size and light weight and is readily adaptable to be used as a premium item.

While there has been described what is considered at the present time to be the preferred embodiment of the present invention, it will be understood that various modifications and alterations may be made therein without departing from the true spirit and scope of the present invention and it is intended to cover in the appended claims all such variations and modifications.

What is claimed is:

1. An integrally connected one piece molded synthetic organic resin structure, for easy assembly into a door knocker capable of producing a predetermined audible sound, comprising a synthetic organic resin base having at least a portion of the rear surface thereof flat, a synthetic organic resin arm connected to said base at spaced apart points by at least two relatively thin struts, each of the struts being easily severed to separate said arm from said base, at least one boss receiving means on one of said arm and the front surface of said base and integral therewith, at least one boss on the other of said arm and the front surface of said base and integral therewith extending therefrom sized to snap fit within said boss receiving means and to be frictionally engaged and maintained thereby, said arm having a size such that when said boss and said boss receiving means are frictionally engaged said arm has a free end thereof overlying a portion of said base which is normally urged toward said base, said arm being flexible to permit the free end thereof when said boss is frictionally engaged and maintained by said boss receiving means to be bent away from said base without breaking said arm, said boss and boss receiving means cooperating with said arm thus mounted on said base to cause said arm to snap back toward and against said base upon release of said arm from the bent away position thereof, thereby striking said base with a predetermined force to make an audible sound.

2. The one piece structure set forth in claim 1, wherein said boss receiving means extends outwardly from said base and said boss extends from said arm in the same direction.

3. The one piece structure set forth in claim 2, wherein said arm has a tab thereon extending away therefrom in a direction opposite to said boss.

4. The one piece structure set forth in claim 3, wherein said arm has a protuberance thereon opposite said tab and extending away therefrom.

5. The one piece structure set forth in claim 1, wherein said arm is arcuate having two legs interconnected by a bight, the base being positioned between said legs and connected thereto and to said bight.

6. The one piece structure set forth in claim 1, wherein said base has on the front surface thereof indicia receiving means.

7. The one piece structure set forth in claim 1, and further comprising means on said flat rear surface of said base for adhering said base to a preselected substrate.

8. The one piece structure set forth in claim 1, wherein the synthetic organic resin is a rigid polyolefin or rigid polystyrene.

9. The one piece structure set forth in claim 1, wherein said arm has spaced apart ribs extending the entire length thereof.

10. An all plastic material door knocker comprising a base having at least a portion of the rear surface thereof flat, an arm a boss and boss receiving means sized frictionally to engage and maintain said boss in said boss receiving means in a snap fit connecting said arm to the front surface of said base to provide a free end of said arm overlying a portion of said base which is normally urged toward said base, said arm being flexible to permit the free end thereof to be bent away from said base without breaking said arm, said base, said boss and boss receiving means cooperating with said arm to cause said arm to snap back toward and against said base upon release of said arm from the bent away position thereof, thereby to strike said base with a predetermined force to make an audible sound.

11. The door knocker set forth in claim 10, wherein said boss is a cylinder extending outwardly of said arm.

12. The door knocker set forth in claim 11, wherein said arm is U-shaped having a cylindrical boss at each end thereof extending outwardly therefrom.

13. The door knocker set forth in claim 12, and further comprising a protuberance on said arm intermediate said bosses extending outwardly of said arm to the same extent as said boss receiving means extends from said base, thereby to ensure contact between said protuberance and said boss when said arm is in the normal position thereof.

14. The door knocker set forth in claim 10, wherein said arm has a tab centrally thereof extending outwardly therefrom in a direction opposite to said boss, said tab extending below the bottom edge of said base to facilitate movement by the user of said arm from the normal position thereof.

* * * * *